US010794470B2

(12) United States Patent
Uhkoetter et al.

(10) Patent No.: US 10,794,470 B2
(45) Date of Patent: Oct. 6, 2020

(54) OIL DISTRIBUTION SYSTEM WITH AT LEAST ONE FIRST AREA THAT IS EMBODIED IN A ROTATABLE MANNER AND A SECOND AREA

(71) Applicant: Rolls-Royce Deutschland Ltd & Co KG, Blankenfelde-Mahlow (DE)

(72) Inventors: Stephan Uhkoetter, Berlin (DE); Uwe Kracht, Berlin (DE); Jens Klostermann, Rangsdorf (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 117 days.

(21) Appl. No.: 16/126,625

(22) Filed: Sep. 10, 2018

(65) Prior Publication Data

US 2019/0085972 A1 Mar. 21, 2019

(30) Foreign Application Priority Data

Sep. 19, 2017 (DE) .......................... 10 2017 121 739

(51) Int. Cl.
*F16H 57/04* (2010.01)
*F01D 25/18* (2006.01)
*F02C 7/36* (2006.01)
(Continued)

(52) U.S. Cl.
CPC ......... *F16H 57/0479* (2013.01); *F01D 25/18* (2013.01); *F02C 7/36* (2013.01);
(Continued)

(58) Field of Classification Search
CPC ............. F16H 57/0479; F16H 57/0486; F16H 57/0482; F16H 57/082; F16H 57/0421;
(Continued)

(56) References Cited

U.S. PATENT DOCUMENTS 2,344,366 A * 3/1944 Price ...................... F04D 25/02
415/64
5,643,126 A 7/1997 Hotta et al.
(Continued)

FOREIGN PATENT DOCUMENTS

DE 10217483 A1 11/2003
EP 0738843 A2 10/1996
(Continued)

OTHER PUBLICATIONS

German Search Report dated Apr. 27, 2018 for counterpart German Patent Application No. DE 102017121739.8.
European Search Report dated Oct. 31, 2018 for counterpart European Patent Application No. EP18193554.

*Primary Examiner* — Jeffrey A Shapiro
(74) *Attorney, Agent, or Firm* — Shuttleworth & Ingersoll, PLC; Timothy J. Klima

(57) ABSTRACT

A gear with an oil distribution system includes a first area at least approximately rotationally symmetrical with, in its radially inner area, an opening. Via the opening, oil is introduced from a second area into the first area during operation. Downstream of the opening with respect to the second area, the first area includes a collecting area extending in the radial and circumferential directions of the first area. An acceleration appliance for the oil, connected to the first area, is provided in the collecting area so a substantially radial flow direction in the direction of a radially outer area of the collecting area is applied to the oil that is present in the collecting area when the first area rotates. An area of the engine provided downstream of an outlet opening is in or can be brought into operative connection with the main oil supply circuit.

16 Claims, 12 Drawing Sheets

Figure 1:
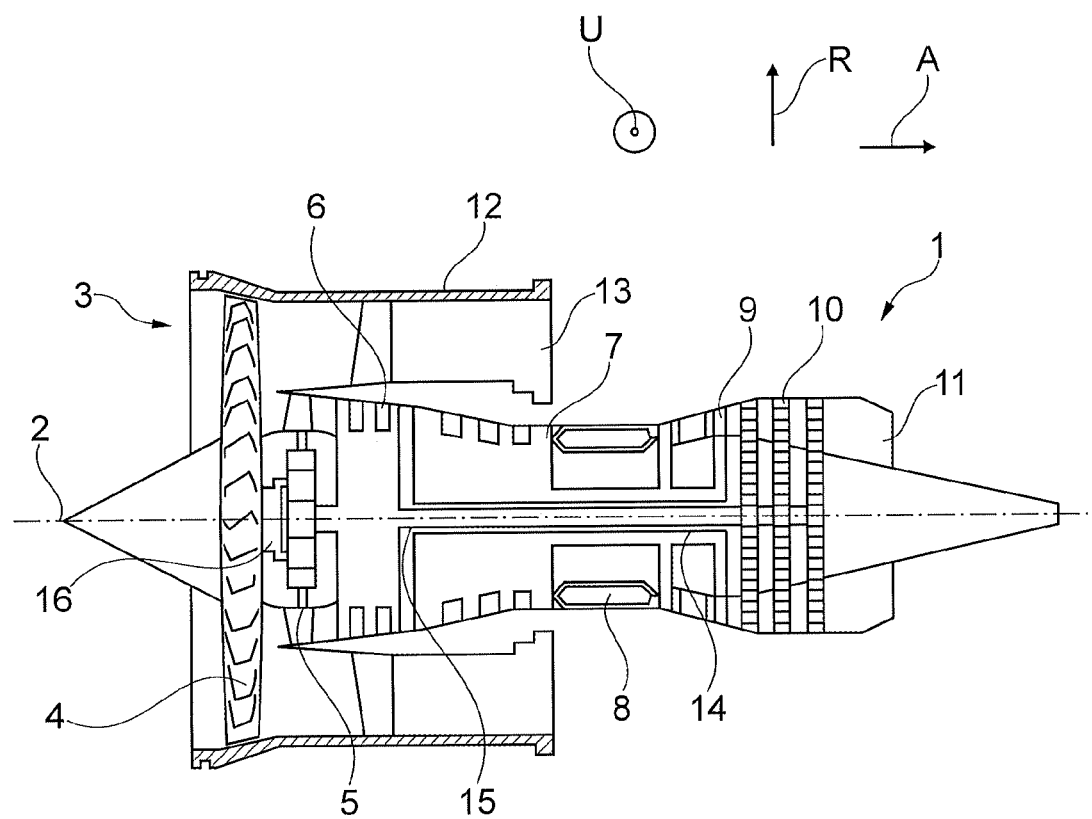

(51) Int. Cl.
*F16H 57/08* (2006.01)

(52) U.S. Cl.
CPC ....... *F16H 57/043* (2013.01); *F16H 57/0427* (2013.01); *F16H 57/0482* (2013.01); *F16H 57/0486* (2013.01); *F05D 2260/40311* (2013.01); *F05D 2260/98* (2013.01); *F16H 57/082* (2013.01)

(58) Field of Classification Search
CPC ............. F16H 57/0423; F16H 57/0424; F16H 57/0426; F16H 57/0427; F16H 57/0428; F16H 57/043; F16H 57/0431; F02C 7/36; F01D 25/18; F05D 2260/98; F05D 2260/40311
See application file for complete search history.

(56) References Cited

U.S. PATENT DOCUMENTS

| | | |
|---|---|---|
| 2013/0045828 A1 | 2/2013 | Morita et al. |
| 2013/0225353 A1 | 8/2013 | Gallet et al. |
| 2016/0273385 A1* | 9/2016 | Otto ................ F01D 25/18 |
| 2016/0377167 A1 | 12/2016 | Sheridan |
| 2018/0258794 A1* | 9/2018 | Gedin ............... F02K 3/04 |

FOREIGN PATENT DOCUMENTS

| | | |
|---|---|---|
| EP | 2570700 A1 | 3/2013 |
| WO | WO2017046481 A1 | 3/2017 |
| WO | WO2017129926 A1 | 8/2017 |

\* cited by examiner

OIL DISTRIBUTION SYSTEM WITH AT LEAST ONE FIRST AREA THAT IS EMBODIED IN A ROTATABLE MANNER AND A SECOND AREA

This application claims priority to German Patent Application DE102017121739.8 filed Sep. 19, 2017, the entirety of which is incorporated by reference herein.

The invention relates to a gear with an oil distribution system.

What is known from US 2016/0377167 A1 is a gear of a jet engine. The gear comprises a sun wheel, a hollow wheel fixedly attached to the housing, and a rotatable planetary carrier via which a fan can be driven. Multiple planetary wheels are in mesh with the sun wheel and the hollow wheel. Via a collecting duct that is connected to the planetary carrier of the gear, oil is guided in the direction of the tooth meshings between the planetary wheels and the hollow wheel. The collecting duct extends in the circumferential direction of the planetary carrier and is embodied to be open radially inside. Oil is introduced via a feed line via the radially internally located opening.

However, disadvantageously the oil that is introduced into the collecting duct is not accelerated inside the collecting duct to an extent that is necessary for it to be conducted further in the direction of the planetary wheel bearing. As a result, there is the danger of an undersupply of the planetary wheel bearings as well as in the area of the tooth meshings between the structural components of the gear. This results, among other things, from the fact that the wall friction between the collecting duct and the oil that is introduced into the collecting duct is not sufficient to accelerated the oil inside the collecting duct in the radial direction in the direction of the planetary wheel bearing.

The present disclosure is based on the objective of providing a gear with an oil distribution system with at least one first area that is embodied in a rotatable manner and a second area by means of which an oil supply of an area that is to be impinged with oil is possible to the desired extent.

According to a first aspect, the gear comprises an oil distribution system with at least one first area that is embodied in a rotatable manner and a second area. In its radially inner area, the first area has at least one opening at least in certain areas. Via the one opening, oil can be introduced in a contact-free manner from the second area into the first area during operation. Downstream of the opening with respect to the second area, the first area additionally comprises a collecting area that extends in the radial direction and in the circumferential direction of the first area. At least one acceleration appliance for the oil that is fixedly connected to the first area is provided in the collecting area, by means of which the oil that is present in the collecting area can be accelerated in the circumferential direction of the collecting when the first area rotates and a substantially radial flow direction can be applied to the oil in the direction of a radially outer area of the collecting area.

The acceleration appliance that is arranged in the collecting area accelerates the oil in the circumferential direction of the collecting area during operation of the oil distribution system. This acceleration ultimately results in the radial oil flow in the collecting area that is necessary for the oil supply, starting from the radially inner area in the direction of the radially outer area, for which the centrifugal force applied to the oil and acting in the radial direction outwards is used. In this way, it is ensured in a simple manner that oil that is introduced into the collecting area in a substantially pressure-free manner is guided further to the desired extent to the areas that are to be supplied with oil independently of the wall friction between the collecting area and the oil that is introduced into the collecting area.

If the flow direction of the oil that is present in the collecting area is regarded based on a relative system that is rotating together with the first area, the oil has a substantially radial flow direction during operation of the oil distribution system. If in contrast the oil flow is regarded based on a stationary system, the oil is moved with the circumferential speed of the collecting area after entering the collecting area, and in this manner is additionally guided radially outwards in the collecting area. In this manner, the relative tangential velocity of the oil is minimized with respect to the first area, and the desired oil pressure that is respectively necessary for the oil supply is built up.

Further, an area of the gear which either can be brought in operative connection or is in operative connection with a main oil supply circuit of a jet engine is additionally provided downstream of the outlet opening.

In this way, the possibility of supplying the gear with hydraulic fluid in addition to the supply via the collecting area or only from the main oil supply circuit during a so-called normal operation of the jet engine, during which a desired impingement of the area downstream of the outlet opening with hydraulic fluid is ensured from the main oil circuit, can be provided in a simple manner. Moreover, there is also the possibility of avoiding an operational state of the gear in which it is undersupplied with hydraulic fluid from the main oil supply circuit by impinging the area downstream of the outlet opening via the collecting area and the outlet opening, wherein in that case this path for the hydraulic fluid represents a part of a so-called auxiliary oil circuit for the gear of the jet engine.

Here, it can be provided that the hydraulic fluid is introduced under pressure into the area downstream of the outlet opening via the main oil supply circuit that is preferably embodied as a closed system.

In a constructionally simple embodiment of the oil distribution system of the gear, the acceleration appliance has at least one wall-like element that extends in the radial and in the axial direction inside the collecting area. In the circumferential direction, the wall-like element at least partially divides the interior space of the collecting area formed by the walls that border the collecting area into collection sections that extend in the circumferential direction. Thus, the embodiment is based on the knowledge that, during operation and thus as the first area is rotating, the oil that is present in the collecting area is pressed against the wall-like element and is deflected radially outwards by the same due to the centrifugal force that is acting during operation. In this manner, the desired radial flow direction is applied to the oil.

If the wall-like element extends in the radial direction of the first area across the entire radial height of the collecting area, the oil that is present in the collecting area is deflected to the desired extent substantially across the entire radial height in the collecting area or is accelerated outwards in the radial direction during operation of the oil distribution system.

In a further advantageous embodiment of the gear, the wall-like element extends only across a portion of the radial height of the collecting area in the radial direction of the first area. Then, an exchange of the oil is possible to the desired extent between the collection sections, so that undesirable imbalanced operational situations can be avoided with small effort.

If the wall-like element extends in the axial direction across the entire axial width of the collecting area, the oil is deflected by the wall-like element in the radially outward direction across the entire axial width of the collecting area, and is guided radially outwards or a radial flow direction in the direction of the radially outer area of the collecting area is applied to the oil by the centrifugal force that is applied to the oil during operation of the gear.

If the wall-like element extends in the axial direction only across a portion of the axial width of the collecting area, again an exchange between the collection sections extending in the circumferential direction is facilitated in a simple manner. In this manner, undesired imbalanced operational states can again be avoided during operation in a simple manner without additional actuation effort.

Imbalanced operational states are avoided in a further advantageous embodiment of the oil distribution system of the gear by embodying the wall-like element with at least one recess, through which an exchange of oil is possible between the collection sections that extend in the circumferential direction. Thus, the collection sections represent so-called communicating vessels, inside of which a uniform oil level occurs.

If the wall-like element is embodied in a flat manner and if it respectively encloses an acute angle with the radially outer area and the radially inner area of the collecting area, so-called dead space areas with low flow direction velocities in the direction of the radially outer area of the collecting area are avoided in a simple manner.

Here, the wall-like element can be arranged so as to extend obliquely in the radial direction inside the collecting area that the end of the wall-like element that is facing towards the radially outer area of the collecting area is arranged in the circumferential direction of the first area in front or behind the end of the wall-like element that faces the radially inner area of the collecting area.

To be able to guide the oil to the desired extent with flow losses that are as low as possible, starting from the radially inner area of the first area in the direction of the radially outer area of the collecting area, the wall-like element is formed with a concave or with a convex curvature in the radial direction of the collecting area in a further advantageous embodiment of the gear.

In a further constructionally simple embodiment of the oil distribution system of the gear, the acceleration appliance comprises a porous material that is arranged in the collecting area of the first area and that is preferably formed as an open-cell foam-like porous material. By means of the porous material, the oil that is introduced into the collecting area can be accelerated in the collecting area in the circumferential direction, and the substantially radial flow direction in the direction of the radially outer area of the collecting area can be applied.

Depending on the respectively present application case, it can be provided that the entire collecting area or only a part of the collecting area is filled with porous material. If only a part of the collecting area is filled with porous material, there is again the possibility that the porous material is provided across the entire circumference of the collecting area, but does not extend across the entire radial height and/or does not extend across the entire axial width of the collecting area.

In contrast to that it can also be provided that the porous material does not extend across the entire circumference of the collecting area and/or does not extend not across the entire radial height and/or dies not extend the across the entire axial width of the collecting area. Here, also multiple areas or sections of the collecting area which are distributed across the circumference can be at least partially filled with porous material.

If the acceleration appliance is embodied with at least one oil filter, dirt particles can be separated from the oil with small effort before the oil is guided on in the direction of an area that is to be impinged by oil.

If the collecting area has at least one outlet opening for the oil in its radially outer area, the oil can be drained out of or guided on from the collecting area in the direction of an area that is to be supplied with oil to the desired extent.

If the collecting area is embodied as a circumferential groove, with its groove base forming the radially outer area of the collecting area and with its open side representing the opening of the radially inner area of the first area, the oil distribution system of the gear is characterized by a constructionally simple structure.

Depending on the respectively present application case, the oil can be introduced out of the [ . . . ] into the collecting area in the radial direction of the oil distribution system of the gear, in the axial direction of the oil distribution system according to the invention, or with any other orientation located in between these.

The first area can be embodied so as to be at least approximately rotationally symmetrical. Here, a cylindrical or circular basis shape is conceivable. In addition, the first area can also be embodied as a polygon with a sufficiently high number of corners.

Alternatively, there is also the possibility that the first area is embodied as a non-rotationally symmetrical polygon. Here, the first area can be embodied depending on the respectively present application case in a triangular, quadrangular, pentagonal or polygonal shape.

In an embodiment that is advantageous with respect to the installation space and characterized by a high power density, the gear is embodied as a planetary gear.

If the first area is provided in the area of a rotatable shaft, preferably in the area of a sun wheel, a planetary carrier, a planetary wheel and/or a hollow wheel, the areas of the gear that are to be supplied with oil can be impinged with oil to the desired extent in a constructionally simple manner.

The features specified in the patent claims as well as the features specified in the following exemplary embodiments of the oil distribution system according to the invention are suitable to further develop the subject matter according to the invention respectively on their own or in any desired combination with each other.

Further advantages and advantageous embodiments of the invention follow from the patent claims and from the exemplary embodiments that are described in principle in the following by referring to the drawing, wherein, with a view to clarity, the same reference signs are used in the description of the different exemplary embodiments for structural components having the same structure and functionality.

Herein:

FIG. 1 shows a schematic rendering of an aircraft engine with a planetary gear;

FIG. 2a to FIG. 2d respectively show a schematic view of different exemplary embodiments of the planetary gear in a longitudinal section view; and FIG. 3a to FIG. 3m respectively show a schematic view of different exemplary embodiments of the planetary gear in a cross-sectional view.

In FIG. 1 shows a turbomachine that is embodied as a jet engine 1 of an aircraft. The jet engine 1 has a main and rotational axis 2. Further, the jet engine 1 comprises, in the axial flow direction, an air intake 3, a fan 4, a planetary gear 5, an intermediate-pressure compressor 6, a high-pressure compressor 7, a combustion device 8, a high-pressure turbine 9, a low-pressure turbine 10 and a discharge nozzle 11. An engine nacelle 12 surrounds the jet engine 1 and delimits the intake 3.

The jet engine 1 operates in a conventional manner, wherein air entering the intake 3 is accelerated by the fan 4 to create two air flows. A first air flow flows into the intermediate-pressure compressor 6 and a second air flow is passed through a subsidiary flow channel 13 or bypass channel to provide a drive thrust. The intermediate-pressure compressor 6 compresses the air flow that is supplied to it, before the air is further compressed in the area of the high-pressure compressor 7.

The compressed air that is discharged from the high-pressure compressor 7 is introduced into the combustion appliance 8, where an intermixing with fuel occurs, and the fuel-air mixture is combusted. The resulting hot combustion products expand and in doing so drive the high-pressure turbine 9 and the low-pressure turbine 10 before they are discharged via the discharge nozzle 11 to provide additional drive thrust. The high-pressure turbine 9 and the low-pressure turbine 10 drive the high-pressure compressor 7 or the intermediate-pressure compressor 6 by means of a high-pressure shaft 14 or a low-pressure shaft 15.

The low-pressure shaft 15 that couples the low-pressure turbine 10 with the intermediate-pressure compressor 6 drives the fan 4 via the planetary gear 5, wherein a drive torque that is applied via the low-pressure shaft 15 to the planetary gear 5 is increased according to the stationary gear ratio of the planetary gear 5 and is supplied to a fan shaft 16, while the rotational speed of the low-pressure shaft 15 is higher by the factor of the stationary gear ratio of the planetary gear 5 than the rotational speed of the fan shaft 16. If the fan 4 is driven by the low-pressure turbine 10, the rotational speed of the low-pressure shaft 15 is reduced according to the gear ratio of the planetary gear 5 in the area of the planetary gear 5 and the fan shaft 16 as well as the fan 4 are driven with this reduced rotational speed and with a torque that is increased as compared to the torque that is applied to the low-pressure shaft 15.

FIG. 2a to FIG. 2d respectively show an enlarged detailed longitudinal section view of different embodiments of the planetary gear 5 according to FIG. 1 in isolation. Since the general structure of the planetary gears 5 shown in FIG. 2a to FIG. 2d is respectively identical and the three embodiments of the planetary gear 5 only differ from each other in partial areas, the general structure as well as the general functionality of the planetary gears 5 according to the FIG. 2a to FIG. 2d will be described more closely in the following based on the rendering according to FIG. 2a.

The planetary gear 5 comprises hollow wheel 23 that is embodied on the housing side in a torque-proof manner, a planetary carrier 24 that is operatively connected to the fan 4, as well as a sun wheel 25 that is coupled to the low-pressure turbine 10. In addition, planetary wheels 26 are mounted in a rotatable manner on the planetary carrier 24, and are in mesh with the hollow wheel 23 as well as with the sun wheel 25.

Assigned to the planetary gear 5 is an oil distribution system 17 that comprises a first area that is embodied in a rotatable manner 18 and a second area 19. In the present case, the first area 18 of the oil distribution system 17 is connected in a torque-proof manner to the planetary carrier 24, and thus rotates with the same rotational speed as the planetary carrier 24 during operation of the jet engine 1. In contrast to that, the second area 19 is attached at the housing side and is thus stationary during operation of the jet engine 1. The first area 18 is embodied in a rotationally symmetrical manner and has an opening 21 in its radially inner area 20. Via the opening 21, oil can be introduced or can be sprayed in under low pressure in a contact-free manner from the second area 19 into the first area 18 through the opening 21 during operation of the jet engine 1 by means oil nozzles 27 that are distributed across the circumference of the first area 18 or of the planetary carrier 24. Further, downstream of the opening 21 with respect to the second area 19, the first area 18 comprises a collecting area 22 that extends in the radial direction and in the circumferential direction U of the first area 18 and in the present case is embodied as a circumferential groove.

In total, the oil distribution system 17 represents a non-closed oil transmission unit and is embodied as a so-called self-adjusting system in which the oil or the lubricant and coolant is sprayed into the rotating groove or into the rotating collecting area 22. Inside the collecting area 22 and in the area of distribution lines 35 that possibly connect thereto, a supply pressure for areas of the planetary gear 5 that are to be impinged with oil is built up due to the centrifugal force that acts on the oil during operation.

To achieve the supply pressure that is necessary for supplying the toothing between the planetary wheels 26 and the hollow wheel 23 as well as the bearings of the planetary wheels 21, an acceleration appliance 28 for the oil that is fixedly connected to the area 18 is provided in the collecting area 22. By means of the acceleration appliance 28, a substantially radial flow direction, starting from the inner area 20 in the direction of a radially outer area 29 of the first area 18 or of the collecting area 22, can be applied to the oil that is present in the collecting area 22 when the first area 18 is rotating.

For this purpose, the acceleration appliance 28 comprises multiple wall-like elements 30 that extend in the radial direction R and in the axial direction A of the planetary gear 5 inside the collecting area 22. The elements 30 divide the interior space of the collecting area 22 formed by the walls that border the collecting area 22 into collection sections 31 that extend in the circumferential direction U.

Figure 2A:
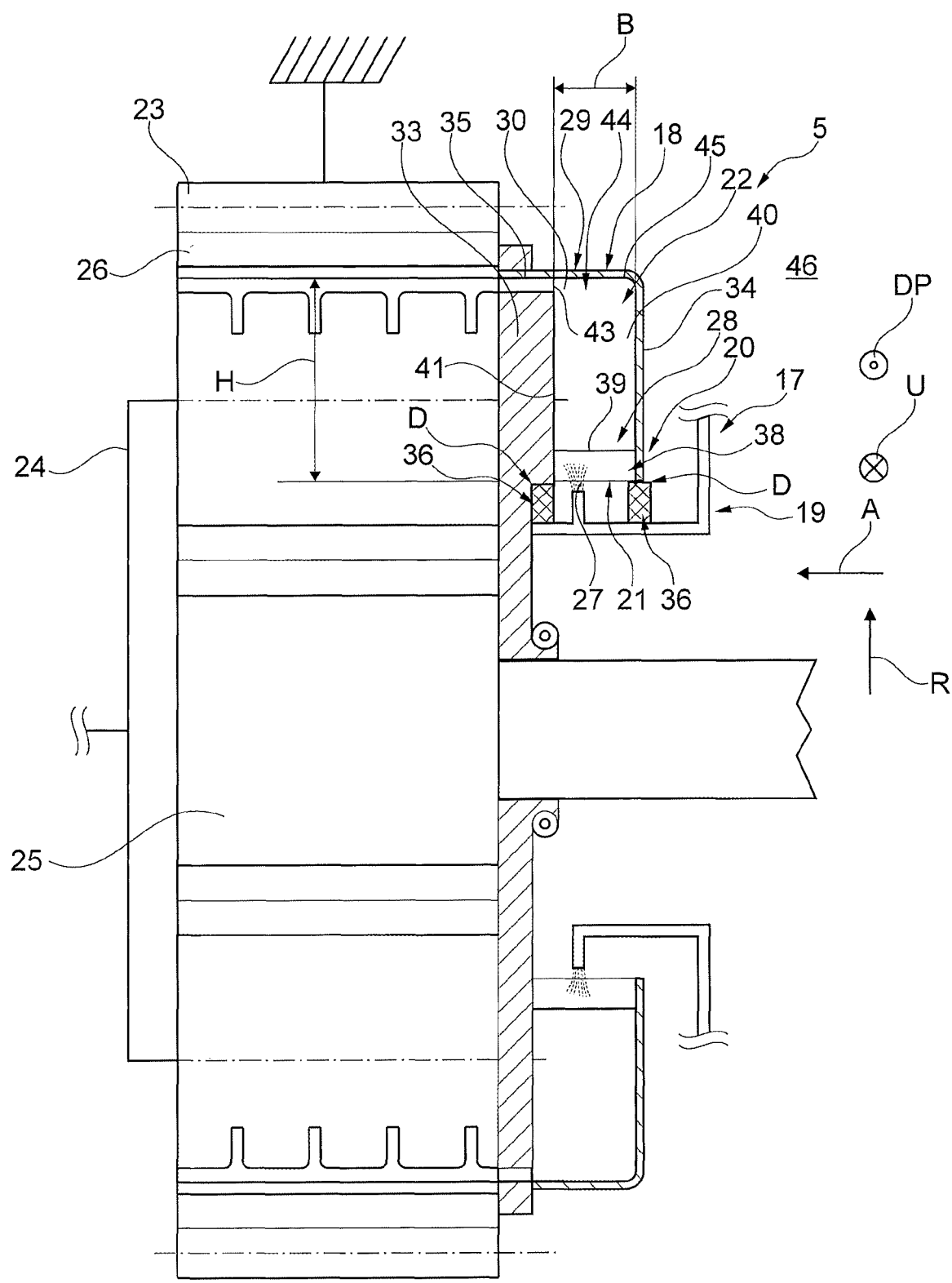

In the exemplary embodiment of the planetary gear 5 shown in FIG. 2a, the wall-like elements 30 extend in the axial direction A across the entire width B of the collecting area 22 between the walls 33 and 34 that laterally bound the collecting area 22. In the present case, the wall 33 is embodied in one piece with the planetary carrier 24. In addition, the wall-like elements 30 extend in the radial direction R of the oil distribution system 17 or of the planetary gear 5, starting from the radially outer area 29 only across a portion of the radial height H of the collecting area 22. Thus, the collection sections 31 are respectively connected to each other via the radial gaps 38 which are embodied between the opening 21 of the first area 18 and the ends 39 of the wall-like elements 30 that are facing towards the opening 21 and via which a defined exchange of oil between the collection sections 31 is possible.

Figure 2B:
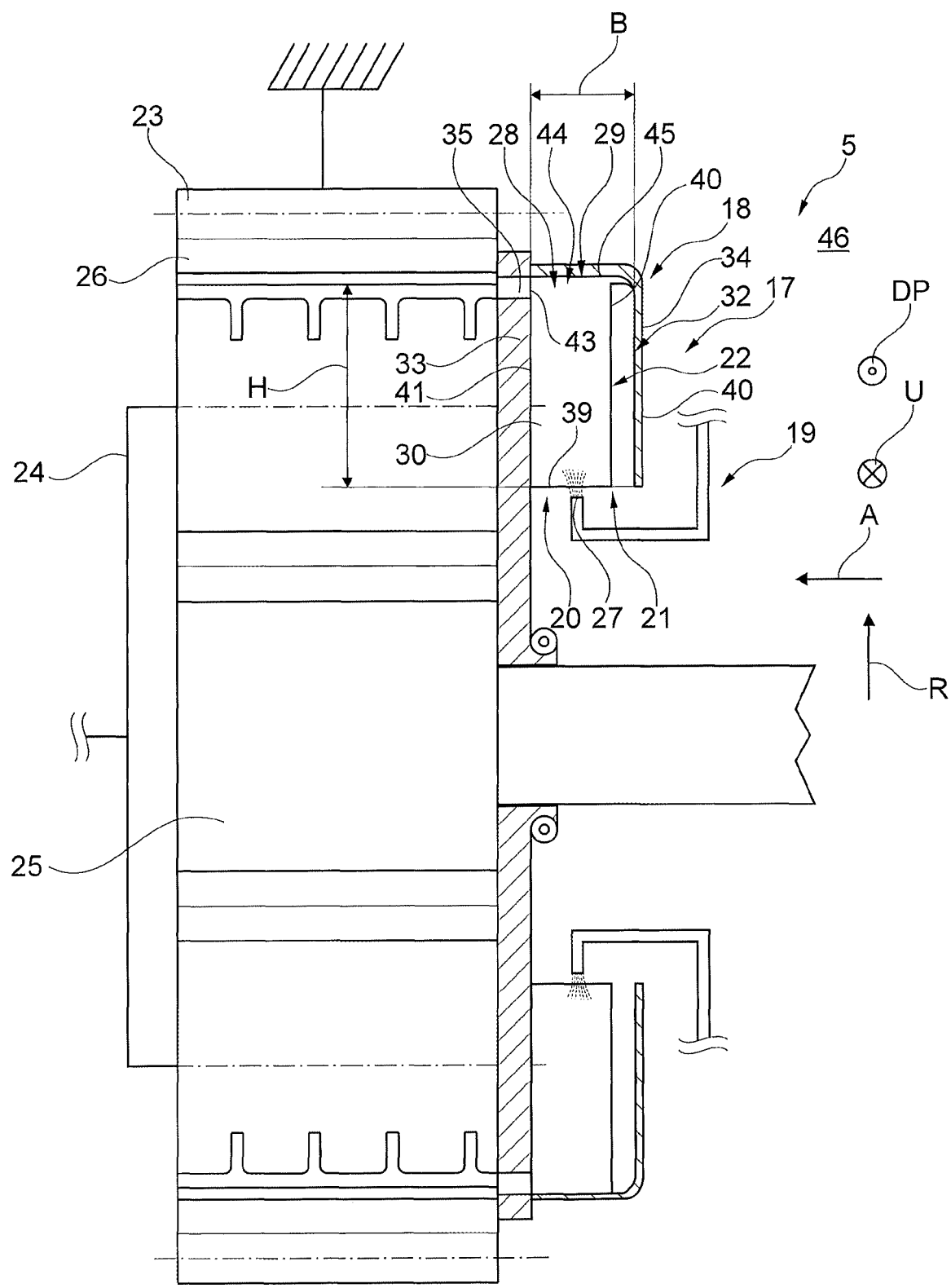
Figure 2C:
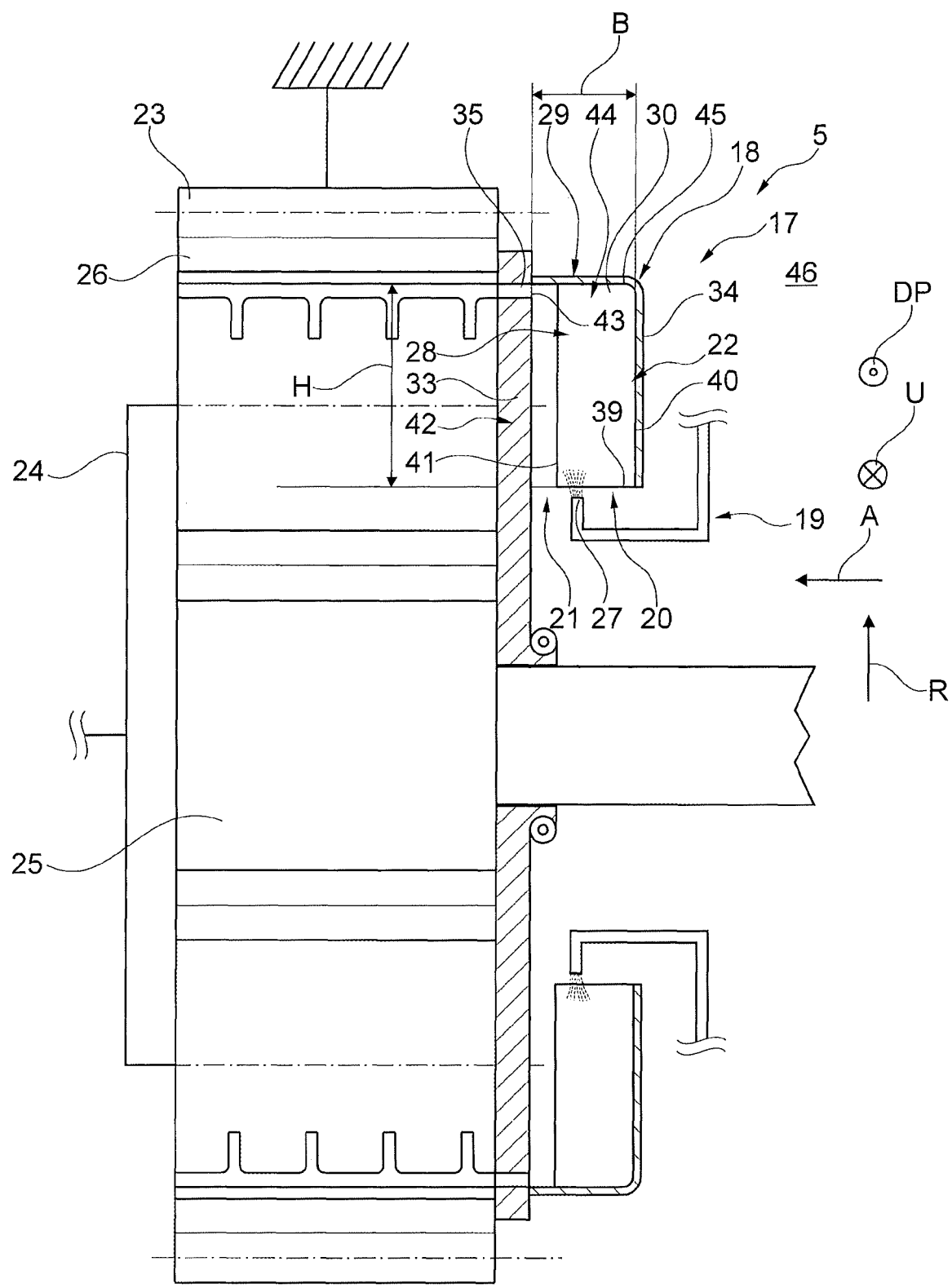

In contrast to that, the wall-like elements 30 of the planetary gears 5 according to FIG. 2b and FIG. 2c extend in the radial direction R of the first area 18 across the entire radial height H of the collecting area 22 and in the axial direction A only across a part of the axial width B.

Between the sides 40 of the wall-like elements 30 that are facing towards the wall 34 and the wall 34, the oil distribution system 17 according to the FIG. 2b respectively has axial gaps 32 via which a defined exchange of oil between the collection sections 31 is also possible. In contrast to that, the oil distribution system 17 of the planetary gear 5 according to the FIG. 2c is respectively embodied with axial gaps 42 in the area between the sides 41 of the wall-like elements 30 that are facing towards the wall 33 and the wall 33, via which a defined exchange of oil between the collection sections 31 is also possible. Through the axial gap 32 and 42 as well as through the radial gap 38, imbalanced operational states due to different filling levels in the collection sections 31 can be avoided in a simple manner.

The oil distribution system 17 embodied as a non-closed system offers the possibility of differently high liquid levels occurring in the radial direction R inside the collecting area 22 during operation of the jet engine 1 depending on the rotational speed of the planetary carrier 24 in a simple manner. The supply pressure in the rotating system in turn depends on the liquid level that is present in the collecting area 22. The result is a self-adjusting and robust supply system through which the loads, for example the bearings of the planetary wheels 26, can be supplied with oil with a considerably lower dependence on the back pressure. If the back pressure, that is, the pressure present in the area of the oil-consuming devices, and the pressure loss up to the oil-consuming devices is inside a pressure range that ensures the oil supply, the self-adjustment is performed through the liquid level in supply lines that are arranged downstream of the collecting area 22.

If the oil volume flow increases, the supply pressure rises as well, so that the oil volume flow guided in the direction of the oil-consuming devices becomes greater. In contrast to that, the supply pressure drops if the volume flow decreases and if the back pressure in the area of the supply lines 35 is correspondingly set, so that running dry of the entire oil system is avoided. In this manner, a reduced but still continuous supply is ensured.

Figure 2D:
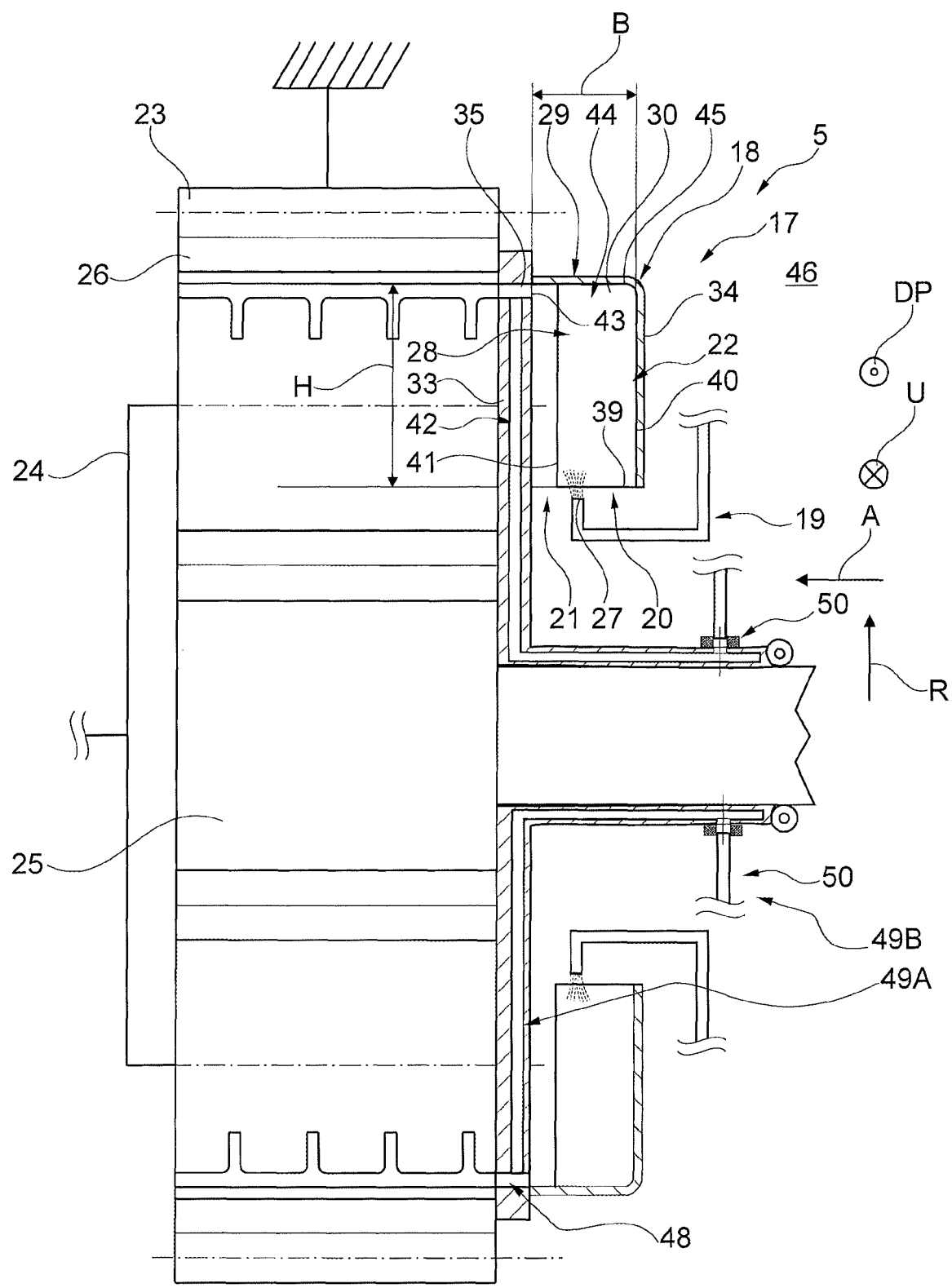

A further advantageous embodiment of the planetary gear 5 is shown in FIG. 2d, in which an area 48 of the planetary gear 5 provided downstream of the outlet opening 43 is additionally in operative connection with a main oil supply circuit 49 of the jet engine 1. Here, a part 49A of the main oil supply circuit 49 extends in the planetary carrier 24. The part 49A of the main oil supply circuit 49 is in operative connection with a part 49B of the main oil supply circuit 49 that extends outside of the planetary carrier 24. In the present case, the interface between the parts 49A and 49B is sealed against the environment 46 by means of a sealing device 50 to avoid undesired leakage.

In a so-called normal operation of the jet engine 1 during which a desired impingement of the area 48 downstream of the outlet opening with hydraulic fluid is ensured, in this embodiment of the planetary gear 5, there is the possibility of supplying the planetary gear 5 with hydraulic fluid additionally to the supply of the area 48 via the collecting area 22 or only from the main oil supply circuit 49. Moreover, there is also the possibility of avoiding an operational state in which the planetary gear 5 is undersupplied with hydraulic fluid from the main oil supply circuit 49 by impinging the area 48 downstream of the outlet opening 43 via the collecting area 22 and the outlet opening 43, wherein in that case this path for the hydraulic fluid represents a so-called auxiliary oil circuit of the jet engine 1.

Here, it can be provided that the hydraulic fluid is introduced under pressure to the area 48 downstream of the outlet opening 43 via the main oil supply circuit 49 that is preferably embodied as a closed system.

FIG. 3a to FIG. 3m respectively show cross-sectional views of different embodiments of the planetary gear 5, with their basic structure and functionality again corresponding to the structure and functionality of the planetary gear 5 according to the FIG. 2a. With a view to clarity, in the following description pertaining to FIGS. 3a to 3m, respectively only the differences between the different exemplary embodiments of the planetary gear 5 are discussed in more detail, and the above description pertaining to FIG. 2a is referred to when it comes to the basic structure and functionality.

Figure 3A:
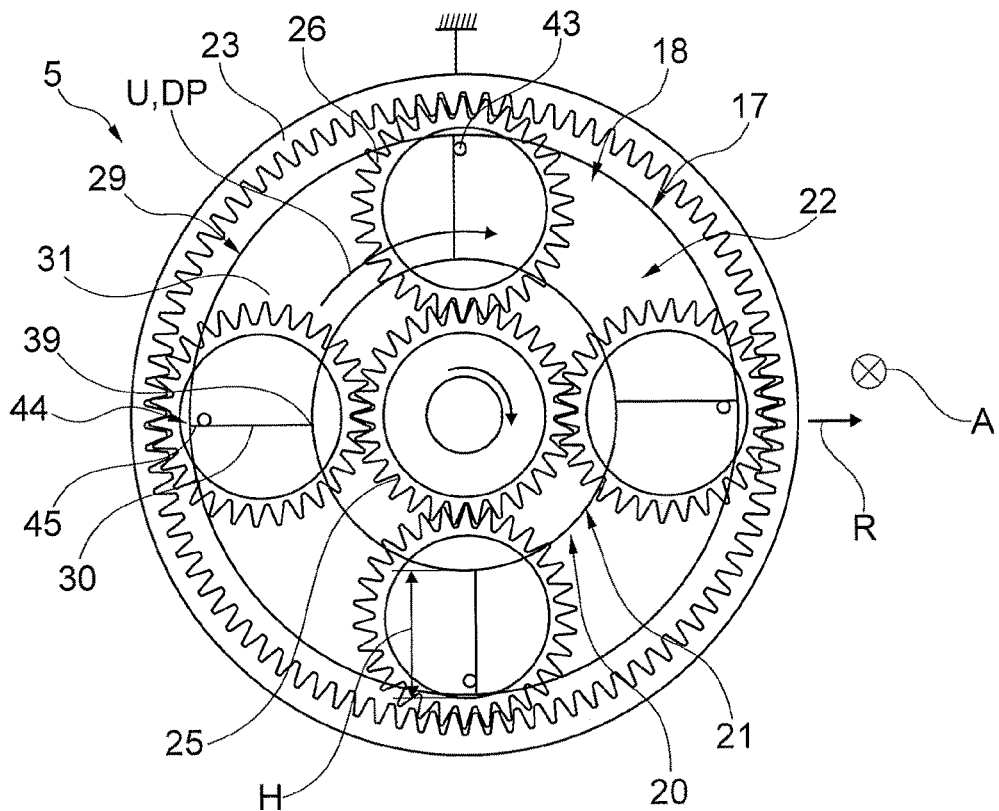

In the exemplary embodiment of the oil distribution system 17 shown in FIG. 3a, the four wall-like elements 30 extend radially outwards in a linear manner inside the collecting area 22 and extend across the entire radial height H and the entire radial width B of the collecting area 22, so that they divide the collecting area 22 in the circumferential direction U without any oil exchange taking place between the collection sections 31. Substantially no oil exchange possible between the collection sections 31 that are separated from each other by the wall-like elements 30 in the circumferential direction U, which is why an oil nozzle 27 is assigned to each collection section 31. Further, the wall-like elements 30 are respectively positioned in the area of the planetary wheels 26 in the circumferential direction U of the planetary carrier 24.

Orifice areas 43 of the supply lines 35 in the collecting area 22, via which the oil can be conducted out from the collecting area 22 or from the collection sections 31 in the direction of the bearings of the planetary wheels 26, among others, are also arranged in the circumferential direction U of the planetary carrier 24 in the area of the planetary wheels 26. Here, the wall-like elements 30 are provided in front of the wall-like elements with respect to the orifice areas 43 respectively in the connection areas 44 between the wall-like elements 30 and the outer radial area 29 of the first area 18 as well as in the rotational direction DP of the planetary carrier 24. In this manner, the oil that is respectively deflected in the radial direction R by the wall-like elements 30 when the planetary carrier 24 is rotating is drained from the collecting area 22 to the desired extent.

Figure 3B:
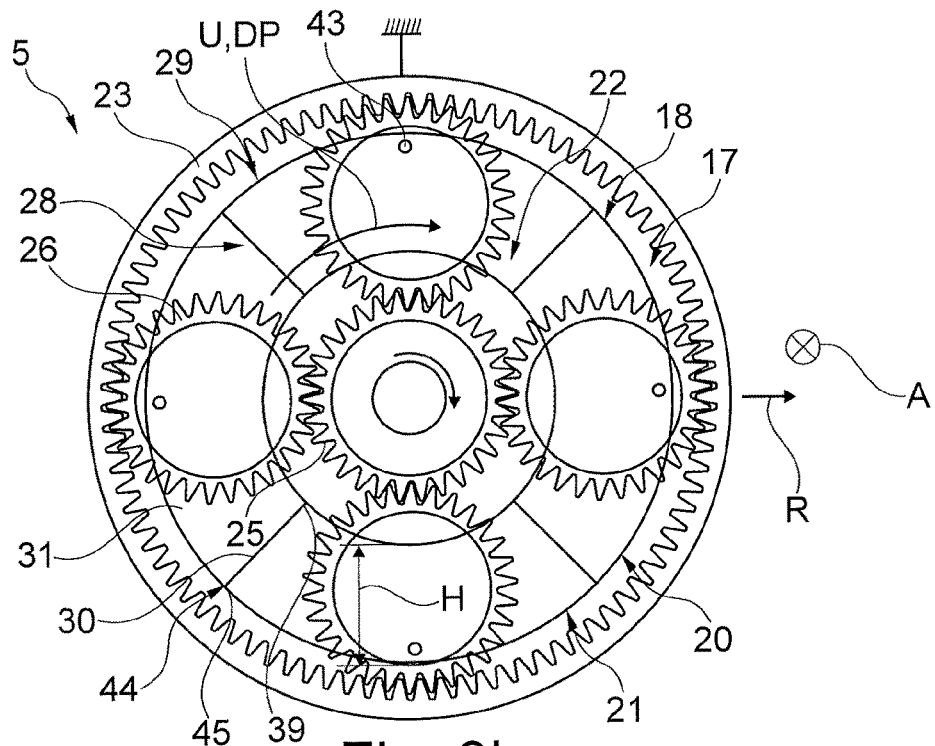

In contrast to that, the wall-like elements 30 26 in the exemplary embodiment of the planetary gear 5 shown in FIG. 3b are arranged so as to be offset in the circumferential direction U with respect to the planetary wheels.

Figure 3C:
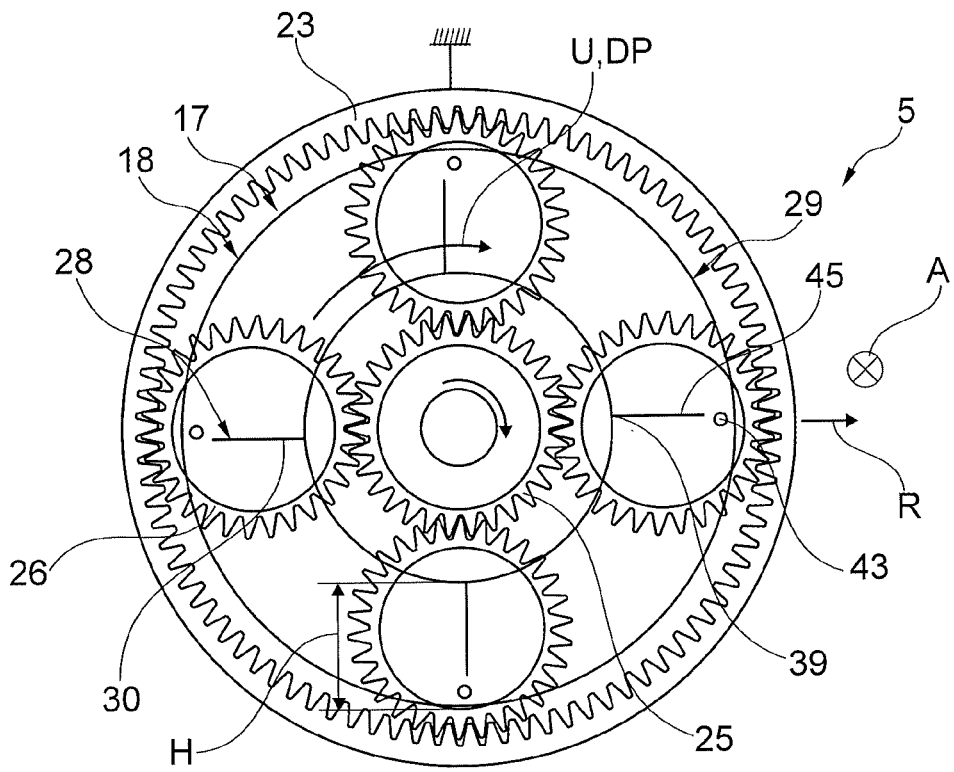
Figure 3D:
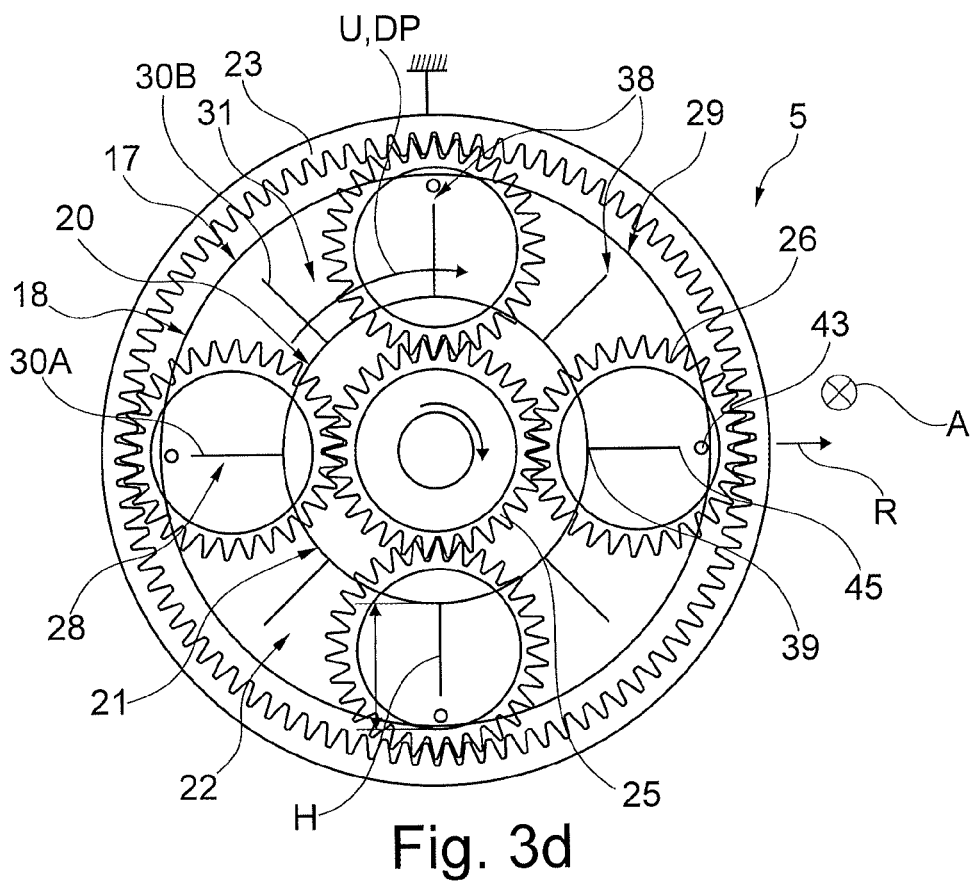

In the exemplary embodiments of the planetary gear 5 that are shown in FIG. 3c and FIG. 3d, the wall-like elements 30, 30A, 30B extend in the radial direction R of the planetary gear 5 or of the first area 18, starting from the radially inner area 20 and in the direction of the outer radial area 29 only across a portion of the radial height H of the collecting area 22. In these embodiments of the planetary gear 5, the axial gaps 32 are provided between the ends 45 of the wall-like elements 30, 30A, 30B that are facing towards the radially outer area 29 and the radially outer area 29. In this way, an oil exchange between the collection sections 31 bordered by the wall-like elements 30, 30A, 30B is again possible, so that imbalanced operational states resulting from different oil levels in the area of the collection sections 31 can be avoided in a simple manner.

The oil distribution system 17 shown in FIG. 3c is again embodied with four wall-like elements 30, that are arranged in the collecting area 30 to the same extent as the wall-like elements 30 according to FIG. 3a. In contrast to that, the oil distribution system 17 according to FIG. 3d comprises eight wall-like elements 30A, 30B. Here, the four wall-like elements 30A are arranged in the collecting area 22 to the same extent as the four wall-like elements 30 according to the FIG. 3c, while the four further wall-like elements 30B are installed inside the collecting area 22 so as to be offset in the circumferential direction U with respect to the planetary wheels 26 and the orifice areas 43, in addition to the elements 30A.

Figure 3E:
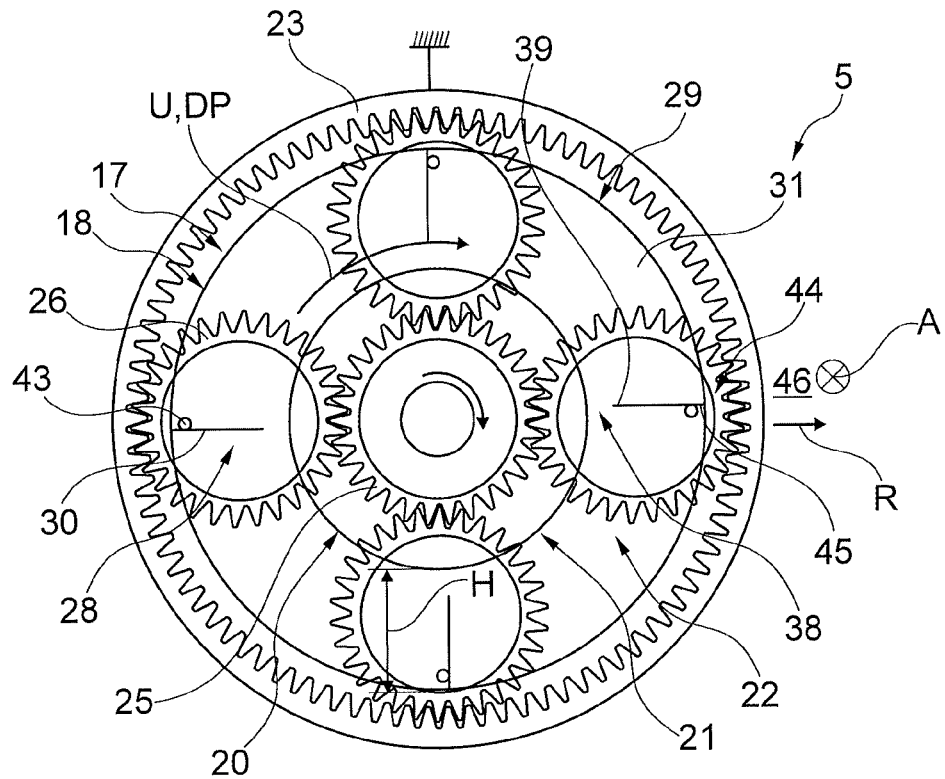

In contrast to the exemplary embodiments shown in FIG. 3c and FIG. 3d, in the exemplary embodiment of the planetary gear 5 shown in FIG. 3e, the oil distribution system 17 of which is embodied with four wall-like elements 30, the axial gaps 32 are respectively provided between the ends 39 of the wall-like elements 30 and the radially inner area 20 of the first area 18 to the extent as described with respect to FIG. 2a. Here, the wall-like elements 30 of the planetary gear 5 according to the FIG. 3e are again arranged so as to be flat and extend in the radial direction R in the collecting area 22.

Figure 3F:
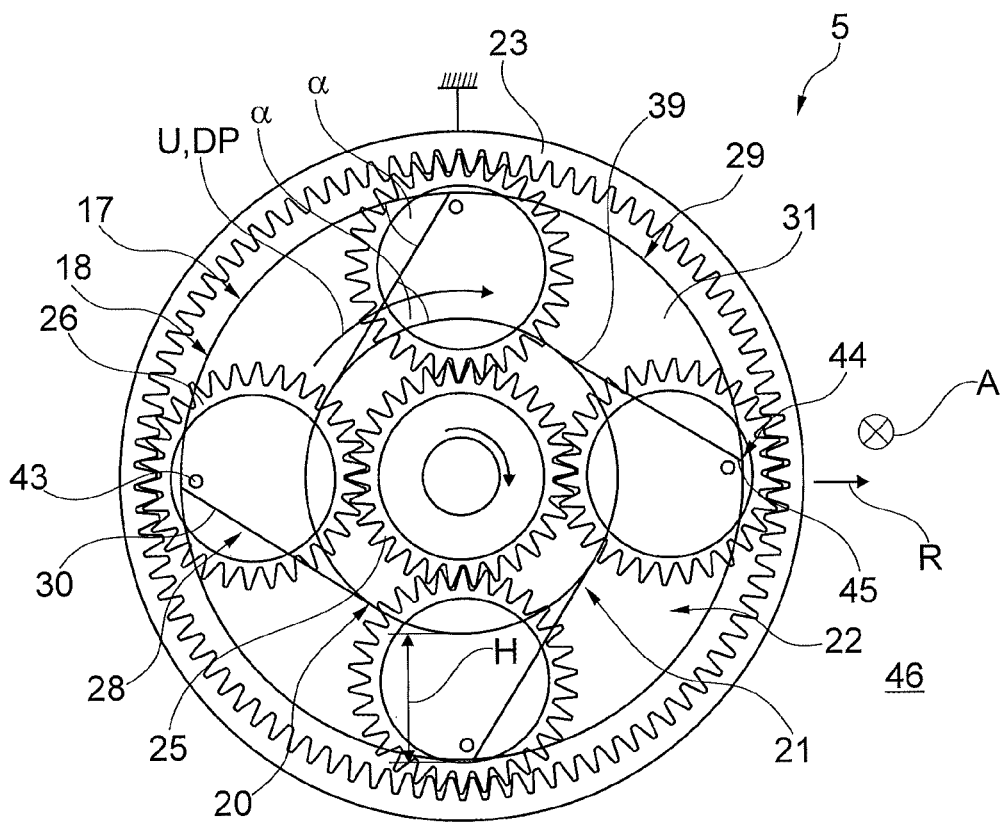

In the exemplary embodiment of the oil distribution system 17 that is shown in FIG. 3f, the four wall-like elements 30 extend substantially across the entire radial height H of the collecting area 22, and respectively enclose an acute angle α with the radially outer area 29 and the radially inner area 20 of the first area 18. Here, the four wall-like elements 30 are arranged to be obliquely oriented inside the collecting area 22 in such a manner that the end 39 of the wall-like elements 30 that is facing towards the radially inner area 20 is respectively arranged in front of the end 45 that is facing towards the radially outer area 29 in the circumferential direction U or in the rotational direction DP of the first area 18.

Figure 3H:
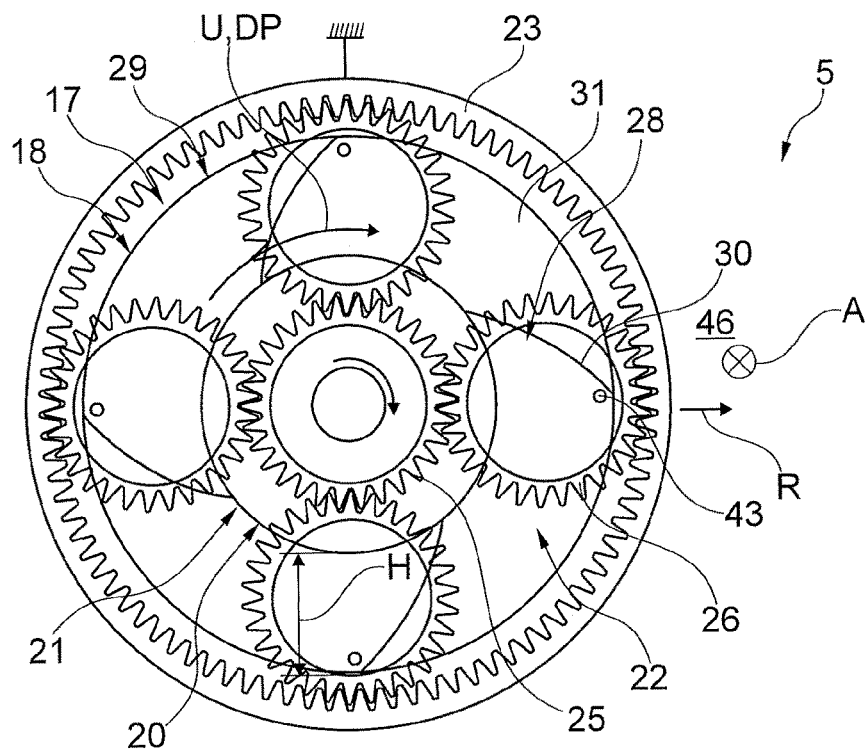
Figure 3I:
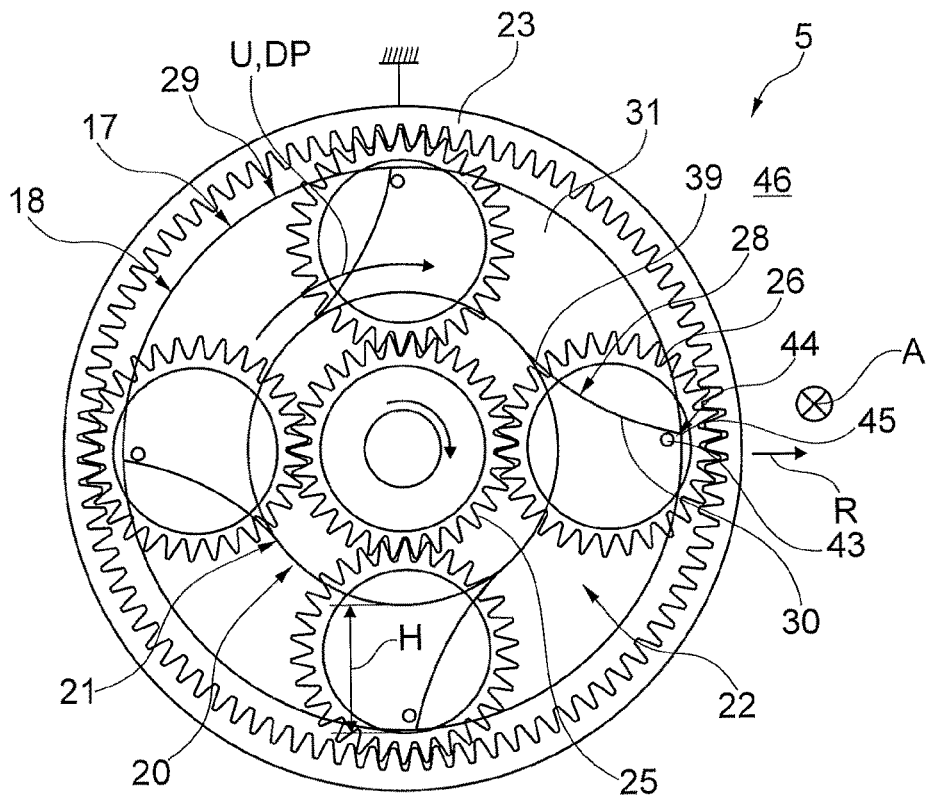
Figure 3J:
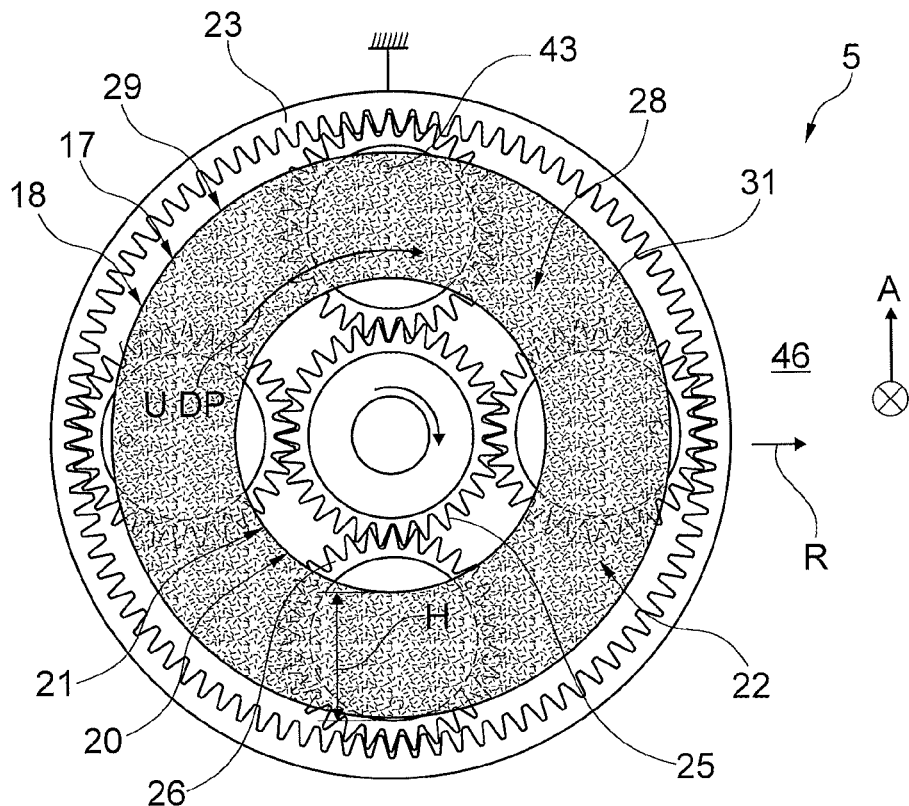
Figure 3K:
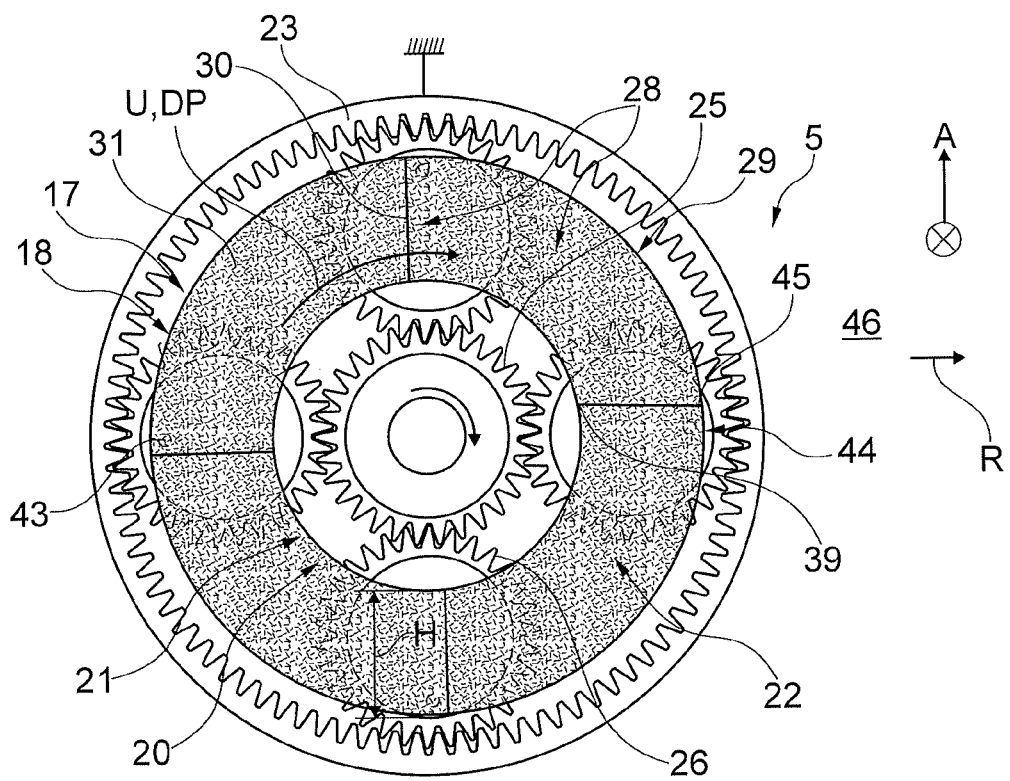
Figure 3G:
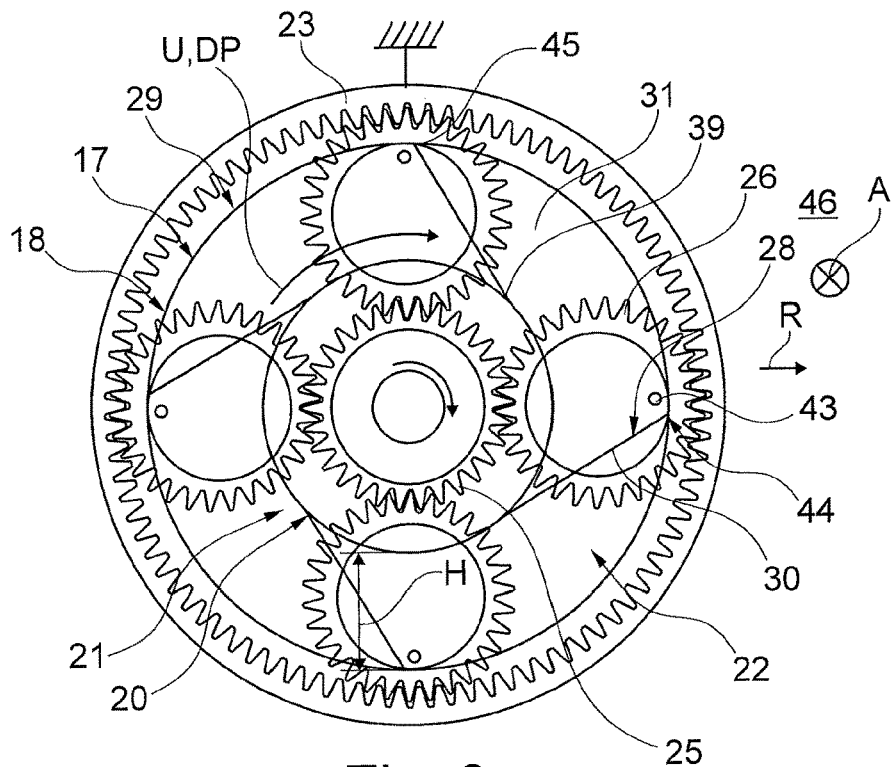

In contrast to that, the four wall-like elements 30 of the exemplary embodiments of the oil distribution system 17 that are shown in FIG. 3g are arranged so as to extend obliquely inside the collecting area 22 in such a manner that the end 39 of the wall-like elements 30 that faces towards the radially inner area 20 is respectively arranged behind the end 45 that is facing towards the radially outer area 29 in the circumferential direction U or in the rotational direction DP of the first area 18.

Further, in the embodiments of the oil distribution system 17 shown in FIGS. 3h and 3i, the wall-like elements 30 are additionally embodied with a convex or with a concave curvature so that the oil can be accelerated to the desired extent in the radial direction R in the area of the collecting area 22 with losses that are as small as possible.

Further, there is also the possibility that the wall-like elements 30 are embodied as screens, perforated metal plates, filters and the like to facilitate the exchange of oil between the collection sections 31 and to be able to filter the oil in the area of the collecting area 22, as well as to achieve a spraying reduction.

If the wall-like elements 30 are embodied with screens for filtration, a closed embodiment of the wall-like elements, i.e. an embodiment of the oil distribution system 17 without radial and axial gaps, is advantageous. In addition, a partial use of fluid filters in the area of the wall-like elements 30 is also conceivable.

Figure 3L:
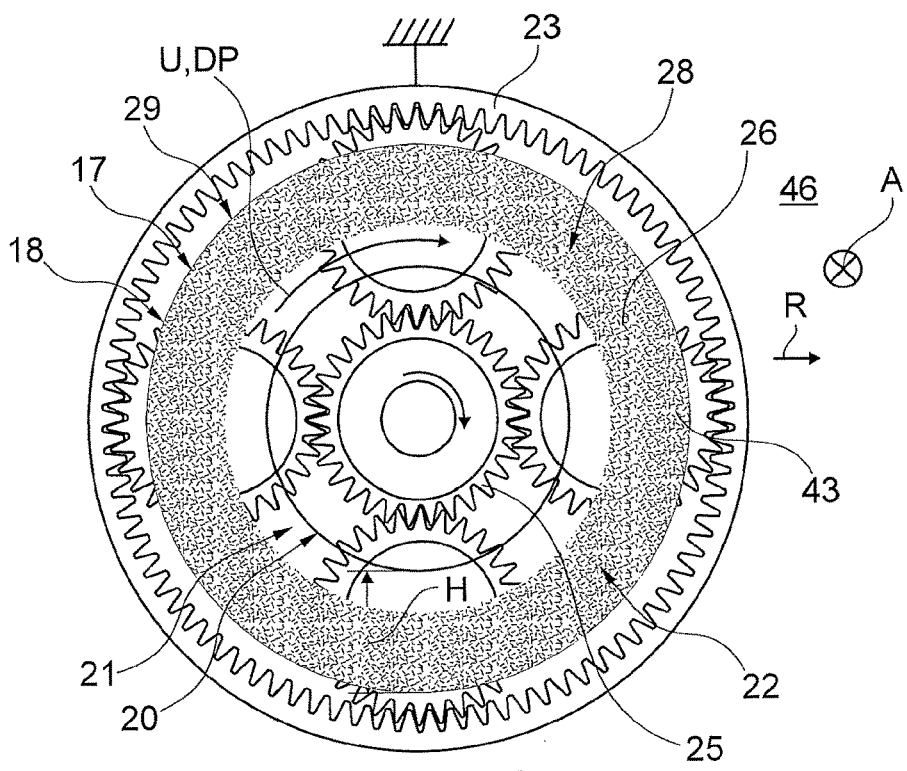
Figure 3M:
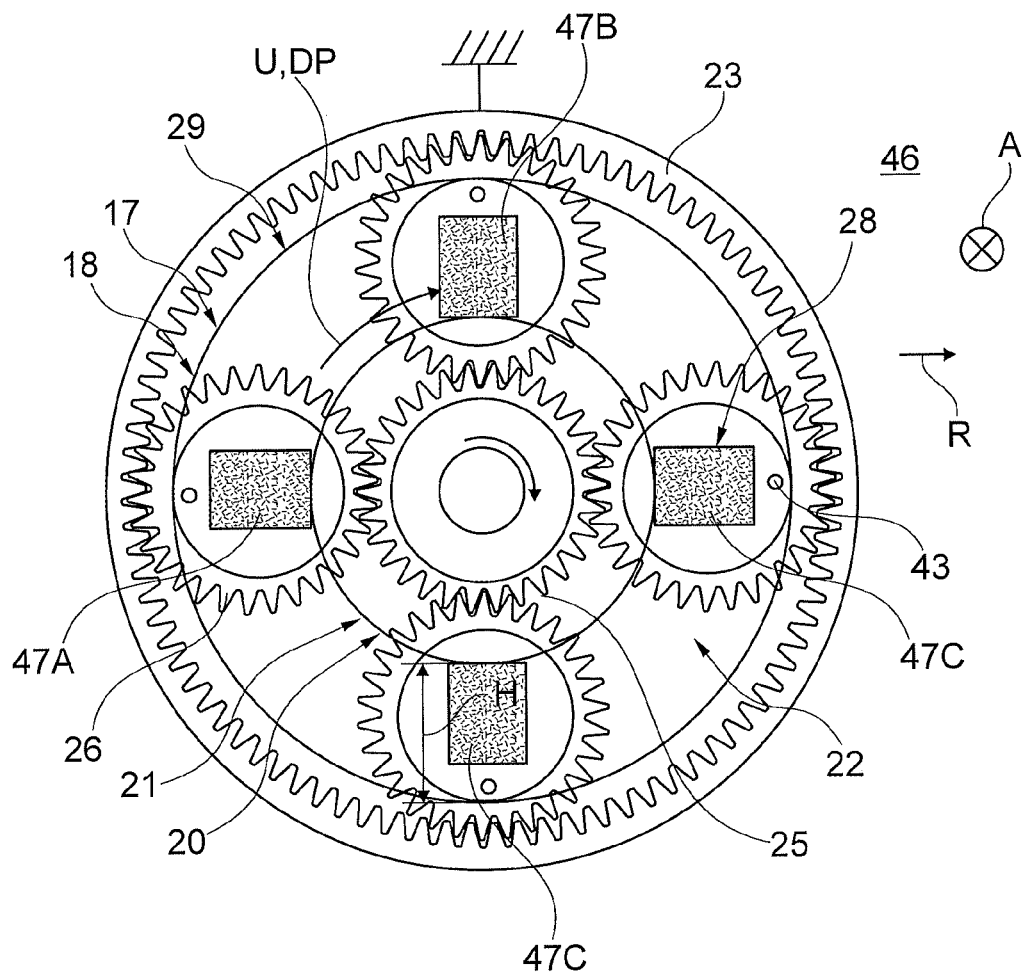

The exemplary embodiments of the planetary gear 5 that are shown in FIGS. 3j and 3m are embodied with acceleration appliances 28 in the collecting area 22, which respectively comprise a porous medium. The acceleration appliance 28 of the oil distribution system 17 of the planetary gear 5 according to FIG. 3k is additionally realized with the wall-like elements 30. Here, there is the possibility of realizing the porous material in the collecting area 22 in the form of a metal foam or the like. The use of such a porous medium has the advantage that spraying can be reduced in case that the fluid jet impinges on unsteadily rotating structural components. Further, starting from the oil nozzles 27, the fluid jet can be directly directed onto the porous medium in the area of the collecting area 22 without causing strong praying of the oil.

A further advantage that can be obtained by using the porous medium is the reduction of gas bubbles in the oil, which can be created as the fluid jet or oil jet impinges onto the rotating structural components. Such gas bubbles should always be reduced in the lubricant, as they can lead to a loss of function. In addition, there is also the possibility of using the porous medium as a filter in order to extract undesired dirt particles from the oil.

In the exemplary embodiments shown in FIG. 3j and FIG. 3k, the entire collecting area 22 is filled with porous material, respectively. In contrast to that, the collecting area 22 in the exemplary embodiment of the oil distribution system 17 shown in FIG. 3l is only partially filled with porous material. Here, the area of the collecting area 22 that is filled with porous material extends across its entire circumference, but only across a part of the entire radial height H of the collecting area 22, starting from the radially outer area 29 radially inwards and additionally across the entire axial width B.

In contrast to that, in the exemplary embodiment of the oil distribution system 17 according to the FIG. 3m, only four areas 47A to 47D of the collecting area 22 that are arranged so as to be evenly distributed across the circumference of the collecting area 22 are filled with porous material. The areas 47A to 47D extend only across a defined width in the circumferential direction of the collecting area 22. Moreover, the areas 47A to 47D also extend only across a portion of the entire radial height H of the collecting area 22 in the direction of the outer radial area 29, starting from the radially inner area 20. In addition, the width of the areas 47A to 47D substantially corresponds to the entire axial width B of the collecting area 22.

Due to the functioning principles that have been previously described in more detail, the oil distribution system 17 of the planetary gear 5 depends on the centrifugal force and thus on the rotational speed. Under pressure in the idle state, an oil supply of hydraulic loads is not possible with an oil distribution system 17 as it has been described more closely above.

However, to be able to ensure an oil supply of the planetary gear 5 also in the idle state of the first area 18, there is the possibility to realize the oil distribution system 17 in the manner as it will be described in more detail in the following.

For this purpose, the oil distribution system 17 is embodied with a sealing device 36, by means of which the supply area of the oil from the second area 19 into the first rotatable area 18 is sealed against the environment 46, only in the upper part of the planetary gear 5 in the area between the first rotatable area 18 and the second area 19 in the manner shown according to FIG. 2a. However, the sealing effect of the sealing device 36 is only efficient below a certain rotational speed or in the idle state of the first area that is embodied in a rotatable manner 18. Thus, in the idle state of the first rotatable area 18, an oil leakage from the oil distribution system 17 in the direction of the environment 46 is avoided in a simple manner.

The pressure of the oil occurs during rotation of the rotatable area 18 through a balance of the centrifugal force acting on the oil and of the static pressure of the liquid column of the oil in the collecting area 22 in the presence of the counteracting gravitational force. When the rotational speeds of the first rotatable area 18 are sufficiently high and a resulting centrifugal force is sufficiently strong, the oil distribution system 17 has the previously described self-adjusting effect.

In order not to compromise the self-adjusting effect through the sealing device 36, the sealing device 36 is embodied and/or arranged in the oil distribution system 17 in such a manner that, due to the applied centrifugal force, it establishes a connection between the first area 18 and the second area 19 during operation for the purpose of pressure equalization between the environment 46 and the supply area of the oil.

In the embodiment of the oil distribution system 17 shown in FIG. 2a, the oil is injected from the second area 19 in the radial direction R into the first rotatable area 18.

In the present case, the sealing device 36 is firmly connected to the second area 19. During operation of the planetary gear 5 and thus during rotation of the first area 18, the first area 18 is moved outwards due to the centrifugal force, while the sealing device 36 is resting. Due to the radial movement of the first area 18 relative to the sealing device 36, a sealing gap D is opened between the sealing device 36 and the first area 18, which facilitates a pressure equalization between the environment 46 and the oil supply area from the second area 19 in the direction of the first area 18. Thus, during operation of the planetary gear 5, as the planetary carrier 24 is rotating, a self-adjusting oil supply can again be present.

In contrast to that, there is also the possibility of the sealing device 36 being firmly connected to the second area 18 and lifting off from the second area 19 during rotation of the first area 18. In that case, the sealing gap D respectively appears between the sealing device 36 and the second area 19, so that the desired pressure equalization is facilitated.

In addition or alternatively to that, there is also the possibility of arranging the oil distribution system 17 in the area of the sun wheel 25, wherein in that case the first rotatable area 18 is to be coupled with the sun wheel so that the rotation, as it is necessary for the supply of the tooth meshing area between the sun wheel 25 and the planetary wheels 26 with oil, can be created during operation of the planetary gear 5.

Further, there is also the possibility of arranging the oil distribution system 17 in the area of the hollow wheel 23 if the hollow wheel is embodied in a rotatable manner. Apart from the previously described supply of the planetary gear 5 with oil, there is also the option of supplying other rotating structural components of the jet engine 1 with oil, such as bearing appliances and the like, via the oil distribution system 17 to the extent as it has been described more closely above.

PARTS LIST 1 turbomachine; jet engine
2 main rotational axis
3 air intake
4 fan
5 planetary gear
6 intermediate-pressure compressor
7 high-pressure compressor
8 combustion device
9 high-pressure turbine
10 low-pressure turbine
11 discharge nozzle
12 engine nacelle
13 bypass channel
14 high-pressure shaft
15 low-pressure shaft
16 fan shaft
17 oil distribution system
18 first area that is embodied in a rotatable manner
19 second area
20 radially inner area of the first area 18
21 opening of the first area 18
22 collecting area
23 hollow wheel
24 planetary carrier
25 sun wheel
26 planetary wheel
27 oil nozzle
28 acceleration appliance
29 radially outer area of the first area 18
30, 30A, 30B wall-like element
31 collection section
32 axial gap
33 wall
34 wall
35 supply line
36 sealing device
38 radial gap
39 end of the wall-like element
40, 41 site of the wall-like element
42 axial gap
43 orifice area
44 connection area between the wall-like elements and the radially outer area 29
45 end of the wall-like element
46 environment
47A to 47D area of the collecting area
48 area of the gear
49 main oil circuit
49A, 49B part of the main oil circuit
50 sealing device
A axial direction
B axial width of the collecting area
D sealing gap
DP rotational direction of the planetary carrier
H radial height of the collecting area
R radial direction
U circumferential direction

The invention claimed is:

1. A gear for an engine, comprising:
an oil distribution system including:
a first area rotatable about an axis of rotation of the engine, wherein the first area includes at least one opening;
a second area including a radially inner area, wherein, in the radially inner area, oil from the second area is introduced into the first area via the at least one opening in a contact-free manner during operation;
wherein the first area comprises a collecting area extending in a radial direction and in a circumferential direction with respect to the axis of rotation of the first area downstream of the at least one opening with respect to the second area, wherein the collectin area includes at least one acceleration appliance for oil, wherein the acceleration appliance is fixedly connected to the first area, wherein oil that is present in the collecting area is accelerated by the at least one acceleration appliance in the circumferential direction of the collecting area when the first area is rotating, and wherein a radial flow direction toward a radially outer area of the collecting area is applied to the oil;

an outlet, wherein the outlet connects the radially outer area of the collecting area for supplying oil from the collecting area to an area of the engine downstream from the outlet; and a main oil supply circuit of the engine separate from the oil supplied to the collecting area and outlet, wherein the area of the engine downstream from the outlet is also connected to the main oil supply circuit.

2. The gear according to claim 1, wherein the acceleration appliance includes at least one wall element that extends in the radial direction and in an axial direction with respect to the axis of rotation inside the collecting area, wherein the acceleration appliance at least partially divides an interior space of the collecting area in the circumferential direction into collection sections extending in the circumferential direction.

3. The gear according to claim 2, wherein the at least one wall element extends in the radial direction of the first area across an entire radial height of the collecting area.

4. The gear according to claim 2, wherein the at least one wall element extends in the radial direction of the first area only across a portion of a radial height of the collecting area.

5. The gear according to claim 2, wherein the at least one wall element extends in the axial direction across an entire axial width of the collecting area.

6. The gear according to claim 2, wherein the at least one wall element extends in the axial direction only across a portion of an axial width of the collecting area.

7. The gear according to claim 2, wherein the at least one wall element includes at least one recess that connects the collection sections that extend in the circumferential direction in the circumferential direction.

8. The gear according to claim 2, wherein the at least one wall element is embodied in a flat manner and respectively encloses an acute angle with the radially outer area of the collecting area and with the radially inner area of the second area.

9. The gear according to claim 2, wherein the at least one wall element includes one chosen from a concave and a convex curvature in the radial direction of the collecting area.

10. The gear according to claim 1, wherein the acceleration appliance comprises a porous material arranged in the collecting area of the first area, in an area of which a substantially radial flow direction in a direction of the radially outer area of the collecting area is applied to oil that is introduced into the collecting area.

11. The gear according to claim 1, wherein the acceleration appliance includes at least one oil filter.

12. The gear according to claim 1, wherein the collecting area is a circumferential groove, with a base of the circumferential groove forming the radially outer area of the collecting area and an open side of the circumferential groove forming the at least one opening of the radially inner area of the first area.

13. The gear according to claim 1, wherein the gear is a planetary gear.

14. The gear according to claim 13, wherein the first area is located in an area of a rotating shaft.

15. The gear according to claim 10, wherein the acceleration appliance comprises an open cell porous material.

16. The gear according to claim 14, wherein the first area is located in an area of at least one chosen from a sun wheel, a planetary carrier, a planetary wheel, and a hollow wheel.

* * * * *